(12) United States Patent
Mujtaba et al.

(10) Patent No.: US 10,034,133 B2
(45) Date of Patent: Jul. 24, 2018

(54) WAVEFORM DESIGN FOR WI-FI TIME-OF-FLIGHT ESTIMATION

(71) Applicant: Apple Inc., Cupertino, CA (US)

(72) Inventors: Syed Aon Mujtaba, Santa Clara, CA (US); Xiaowen Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/218,434

(22) Filed: Jul. 25, 2016

(65) Prior Publication Data

US 2017/0188192 A1 Jun. 29, 2017

Related U.S. Application Data

(60) Provisional application No. 62/387,340, filed on Dec. 23, 2015.

(51) Int. Cl.
| | |
|---|---|
| *H04W 24/00* | (2009.01) |
| *H04W 4/02* | (2018.01) |
| *H04L 27/18* | (2006.01) |
| *G01S 11/02* | (2010.01) |
| *G01S 11/08* | (2006.01) |
| *H04L 27/00* | (2006.01) |
| *H04W 64/00* | (2009.01) |
| *H04L 27/26* | (2006.01) |

(52) U.S. Cl.
CPC ............ *H04W 4/023* (2013.01); *G01S 11/02* (2013.01); *G01S 11/08* (2013.01); *H04L 27/0008* (2013.01); *H04L 27/18* (2013.01); *H04L 27/2613* (2013.01); *H04L 27/2662* (2013.01); *H04L 27/2692* (2013.01); *H04W 64/00* (2013.01); *H04L 27/2607* (2013.01); *H04L 27/2675* (2013.01)

(58) Field of Classification Search
CPC ..................................................... H04M 7/125
USPC .... 455/562.1, 434, 450, 501, 458, 425, 101, 455/224.4, 456.1, 226.3, 272, 132
See application file for complete search history.

(56) References Cited

U.S. PATENT DOCUMENTS

| | | | | |
|---|---|---|---|---|
| 5,956,624 | A * | 9/1999 | Hunsinger | ............ H04B 1/406 375/285 |
| 7,116,632 | B2 | 10/2006 | Alapuranen | |
| 8,265,011 | B2 | 9/2012 | Sugar et al. | |
| 9,383,430 | B2 | 7/2016 | Keegan | |
| 2008/0062935 | A1* | 3/2008 | Nakagawa | ............ H04L 7/042 370/335 |

(Continued)

*Primary Examiner* — Joseph Arevalo

(74) *Attorney, Agent, or Firm* — Meyertons Hood Kivlin Kowert & Goetzel, P.C.; Jeffrey C. Hood; Matthew C. Washburn

(57) ABSTRACT

Some embodiments relate to a waveform design for time-of-flight estimation in a wireless communication system. The waveform may include a number N of signal tones, wherein the number N of signal tones is greater than a number M of signal tones that the receiving wireless device is configured to decode. Upon receipt of the waveform, the receiving wireless device may store a timestamp which indicates a time of receipt of the waveform. The receiving wireless device may decode M of the N signal tones. For example, the receiving wireless device may decode the middle M signal tones of the N signal tones. One or more of the transmitting or receiving wireless devices may then estimate a distance between them based at least in part on the timestamp.

20 Claims, 6 Drawing Sheets

(56) References Cited

U.S. PATENT DOCUMENTS

| | | | | |
|---|---|---|---|---|
| 2010/0303166 | A1* | 12/2010 | Piedras | H04L 27/2636 |
| | | | | 375/267 |
| 2010/0309051 | A1* | 12/2010 | Moshfeghi | G01S 5/0236 |
| | | | | 342/378 |
| 2011/0267956 | A1* | 11/2011 | Yonge, III | H04L 12/413 |
| | | | | 370/241 |
| 2012/0166119 | A1* | 6/2012 | Nentwig | H04L 25/0384 |
| | | | | 702/66 |
| 2013/0030931 | A1* | 1/2013 | Moshfeghi | G01S 19/48 |
| | | | | 705/16 |
| 2013/0258873 | A1* | 10/2013 | Stauffer | H04L 25/03343 |
| | | | | 370/252 |
| 2015/0229507 | A1* | 8/2015 | Kim | H04L 27/2692 |
| | | | | 375/260 |
| 2016/0142898 | A1* | 5/2016 | Poitau | H04W 72/0413 |
| | | | | 370/329 |
| 2017/0026798 | A1* | 1/2017 | Prevatt | H04W 4/023 |
| 2017/0070914 | A1* | 3/2017 | Chun | H04L 1/0026 |
| 2017/0237485 | A1* | 8/2017 | Wood | H04B 10/11 |

* cited by examiner

WAVEFORM DESIGN FOR WI-FI TIME-OF-FLIGHT ESTIMATION

PRIORITY CLAIM

This application claims benefit of priority of U.S. provisional application 62/387,340 titled "Waveform Design for Wi-Fi Time-of-Flight Estimation" filed on Dec. 23, 2015 whose inventors were Syed Aon Mujtaba and Xiaowen Wang, and which is hereby incorporated by reference in its entirety as though fully and completely set forth herein.

FIELD

The present disclosure relates to wireless communication systems, including techniques for performing time-of-flight estimation in such systems, e.g., IEEE 802.11 wireless systems.

DESCRIPTION OF THE RELATED ART

Wireless communication systems are increasingly widespread. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Devices that implement wireless communication technologies are commonly mobile or portable. It is often useful to estimate the position or location of such devices. For example, it may be helpful to be able to determine the location of a device that has been separated from its user or lost. It may also be desirable to estimate the position of a device for map applications, Internet search applications, social networking applications, targeted advertising, determining locations of available services such as printers, etc.

In current systems, position estimation is typically performed using GPS (Global Positioning System) technology (or GLONASS technology), which is integrated into the mobile device. However, alternative Wi-Fi-based positioning systems may be used where technologies like GPS and GLONASS perform poorly, e.g., when the mobile device experiences multipath issues or suffers from signal blockage due to being indoors. Some Wi-Fi-based positioning systems use time-of-flight estimation to determine the distance and position of a mobile device relative to another device, such as another mobile device or a Wi-Fi access point. However, improvements in the field are desired.

SUMMARY

This document describes, inter alia, methods for performing time-of-flight estimation (ToFE) in a wireless communication system, such as an IEEE 802.11 (Wi-Fi) wireless communication system, and describes wireless devices configured to implement the described methods.

A receiving wireless device receives a waveform in a wireless transmission transmitted by a transmitting wireless device. The waveform is configured for use in performing time-of-flight estimation. The waveform may include a number N of signal tones, wherein the number N of signal tones is greater than a number M of signal tones that the receiving wireless device is configured to decode. Upon receipt of the waveform, the receiving wireless device may store a timestamp that indicates a time of receipt of the waveform. The receiving wireless device may also decode M of the N signal tones. For example, the receiving wireless device may decode the middle M signal tones of the N signal tones. One or more of the receiving wireless device or the transmitting wireless device may then estimate a distance between the receiving wireless device and the transmitting wireless device based at least in part on the timestamp.

In some embodiments, the receiving wireless device conforms to a wireless standard that specifies a first type of encoding; and the waveform is encoded using a second different type of encoding. For example, the receiving wireless device may conform to the 802.11n standard which specifies binary phase shift keying (BPSK) encoding, and the waveform may be encoded using quaternary phase shift keying (QPSK) encoding.

In some embodiments the waveform includes a cyclic prefix sent immediately prior to the N signal tones and a cyclic postfix sent immediately after the N signal tones. Each of the cyclic prefix and the cyclic postfix may include a portion of the N signal tones. A timestamp may be created by the receiving wireless device at a time interval between the cyclic prefix and a start of the N signal tones.

In some embodiments, the waveform includes two consecutive groups of N signal tones. The number N of signal tones in each group may be greater than a number M of signal tones that the receiving wireless device is configured to decode. The two consecutive groups of N signal tones may include a first group of N signal tones encoded using phase shift keying on an in-phase axis and a second group of N signal tones encoded using phase shift keying on a quadrature axis. The receiving wireless device may operate to decode M signal tones in each of the groups of N signal tones.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
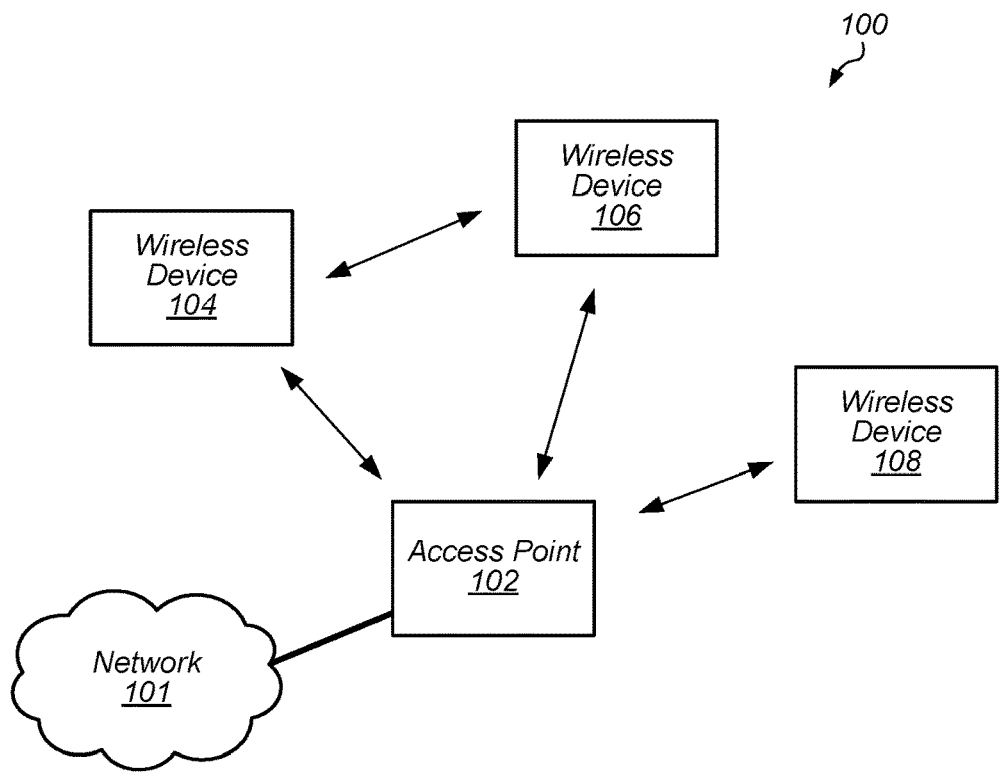
FIGS. 1-2 illustrate example (and simplified) wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—any of various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In the present disclosure, the term "wireless device" is also used or "UE device" can be broadly defined to encompass any electronic, computing, and/or telecommunications device (or combination of devices) which is easily transported by a user and capable of wireless communication.

Access Point (AP)—The term "Access Point" has the full breadth of its ordinary meaning, and at least includes a wireless communication station installed at a fixed location and used to communicate with mobile or stationary wireless devices as part of a wireless communication system, e.g., a Wi-Fi system.

Wireless Device—The term "Wireless Device" has the full breadth of its ordinary meaning, and at least includes a device which may be mobile or may be installed at a fixed location and which communicates in a wireless manner. The term "Wireless Device" includes Stations and Access Points as defined herein.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Wi-Fi—refers to short range wireless communication technology, such as that based on IEEE 802.11 wireless standards such as 802.11a, 802.11.b, 802.11g, 802.11n, 802.11-2012, 802.11ac, and/or other IEEE 802.11 standards. IEEE 802.11 technology may be referred to as "Wi-Fi" or "wireless local area network (WLAN)" technology.

Time-of-flight Estimation—this phrase includes the full breadth of its ordinary meaning, and at least includes a transmitting device sending a waveform to a receiving device so that either the transmitting or receiving device can use the time of arrival of the waveform to estimate its relative distance from the other device.

Figure 2:
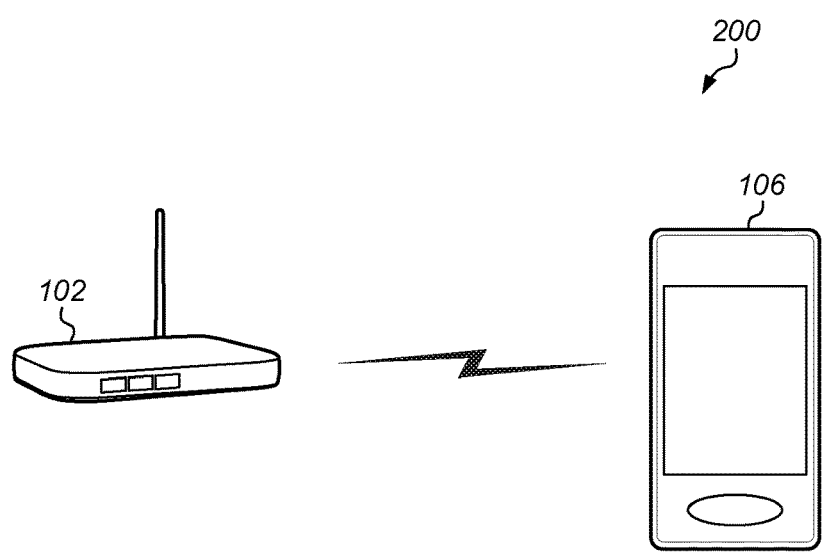

FIGS. 1-2—Communication System

FIG. 1 illustrates an example (and simplified) wireless communication system 100, according to some embodiments. It is noted that the system 100 of FIG. 1 is merely one example of a possible system, and embodiments may be implemented in any of various systems, as desired. For example, note that although the example wireless communication system 100 illustrated in FIG. 1 is shown as including four wireless devices, aspects of the disclosure may be implemented in wireless communication systems having greater or lesser numbers (i.e., any number) of wireless devices.

As shown, the example wireless communication system 100 includes multiple wireless devices 102-108 which communicate over a transmission medium. Some or all of the wireless devices may be substantially mobile devices ("stations" or "STAs"). Alternatively, or in addition, some or all of the wireless devices may be substantially stationary. The wireless devices 102-108 may operate in a Wi-Fi network according to aspects of the present disclosure.

The wireless devices 102-108 may communicate over the wireless transmission medium in such a manner as to form a wireless network. The wireless network may be an IEEE 802.11 network provided by a dedicated access point (e.g., wireless device 102); alternatively, the wireless network may be an 'ad-hoc' or peer-to-peer based network. At least one of the wireless devices 102-108 may be configured to determine its relative distance from another device using time-of-flight estimation (ToFE) and based on a waveform used in the ToFE.

One or more of the wireless devices 102-108 may be equipped to communicate with one or more external networks. For example, as shown, a wireless device may be a Wi-Fi access point 102 that may be communicatively coupled to network 101. Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.). Further, one or more of the wireless devices 102-108 may be configured to communicate using at least one cellular communication protocol (e.g., GSM, UMTS, LTE, LTE-Advanced (LTE-A), 3GPP2 CDMA2000 (e.g., 1×RTT, 1×EV-DO, HRPD, eHRPD), etc.). Other combinations of wireless communication standards (including more than two wireless communication standards) are also possible. One or more or the wireless devices may be configured to perform time of flight estimation as described herein.

FIG. 2 illustrates an example wireless communication system 200 in which aspects of the system 100 of FIG. 1 are represented, according to some embodiments. As shown in the illustrated system, wireless device 106 may be a mobile station (STA) 106 and wireless device 102 may be an access point 102 (also referred to as an "AP"). The STA 106 may be a user device as defined above with Wi-Fi communication capability, such as a mobile phone, a hand-held device, a wearable device, a computer or a tablet, or any other type of Wi-Fi capable wireless device. The AP 102 may be an access point with Wi-Fi communication capability, such as a wireless router or other wireless access point.

Either or both of the AP 102 and the STA 106 (or any of the devices shown in FIG. 1) may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106. The AP 102 and the STA 106 may be configured to perform time of flight estimation as described herein.

Figure 3:
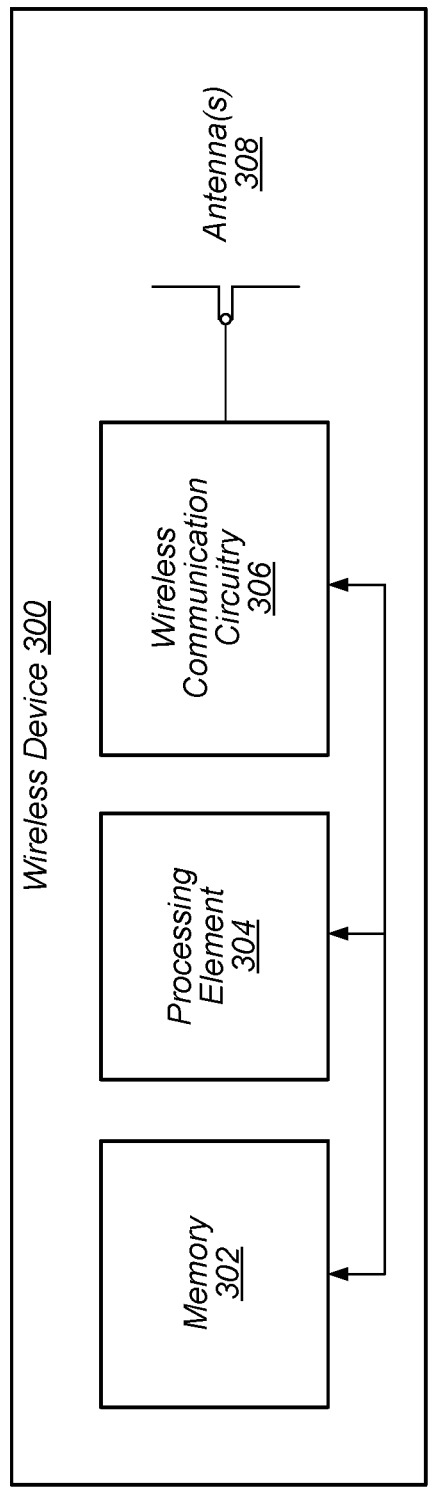
FIG. 3 illustrates a block diagram of an example wireless device, according to some embodiments.

FIG. 3—Example Block Diagram of a Wireless Device

FIG. 3 illustrates an example block diagram of a wireless device 300 that may be configured for use in conjunction with various aspects of the present disclosure, according to some embodiments. The device 300 may be any of a variety of types of device and may be configured to perform any of a variety of types of functionality. For example, the device 300 may be a STA as defined above and/or a Wi-Fi access point 102 as shown above.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 can be (or include) RAM serving as a system memory for processing element 304. Other types of memory and functions are also possible.

The device 300 may also include wireless communication circuitry 306. The wireless communication circuitry 306 may include analog and/or digital circuitry components, and may alternatively be referred to as a 'radio'. In general, a radio may include any or all of a baseband processor, analog RF signal processing circuitry (e.g., including filters, mixers, oscillators, amplifiers, etc.), and/or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled (directly or indirectly) to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may provide processing capability for the wireless communication circuitry 306. For example, the processing element 304 and/or the wireless communication circuitry 306 may be configured to decode a received security sequence and/or determining a relative distance of another device based on time-of-flight estimation procedures, as described herein. The device 300 may be configured to communicate using any of various wireless communication technologies by way of wireless communication circuitry 306 and antenna(s) 308. For example, the device 300 may be configured to transmit and/or receive an improved waveform for use in performing time-of-flight estimation, as described herein, by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing features for performing time-of-flight estimation using an improved waveform as described herein.

Figure 4:
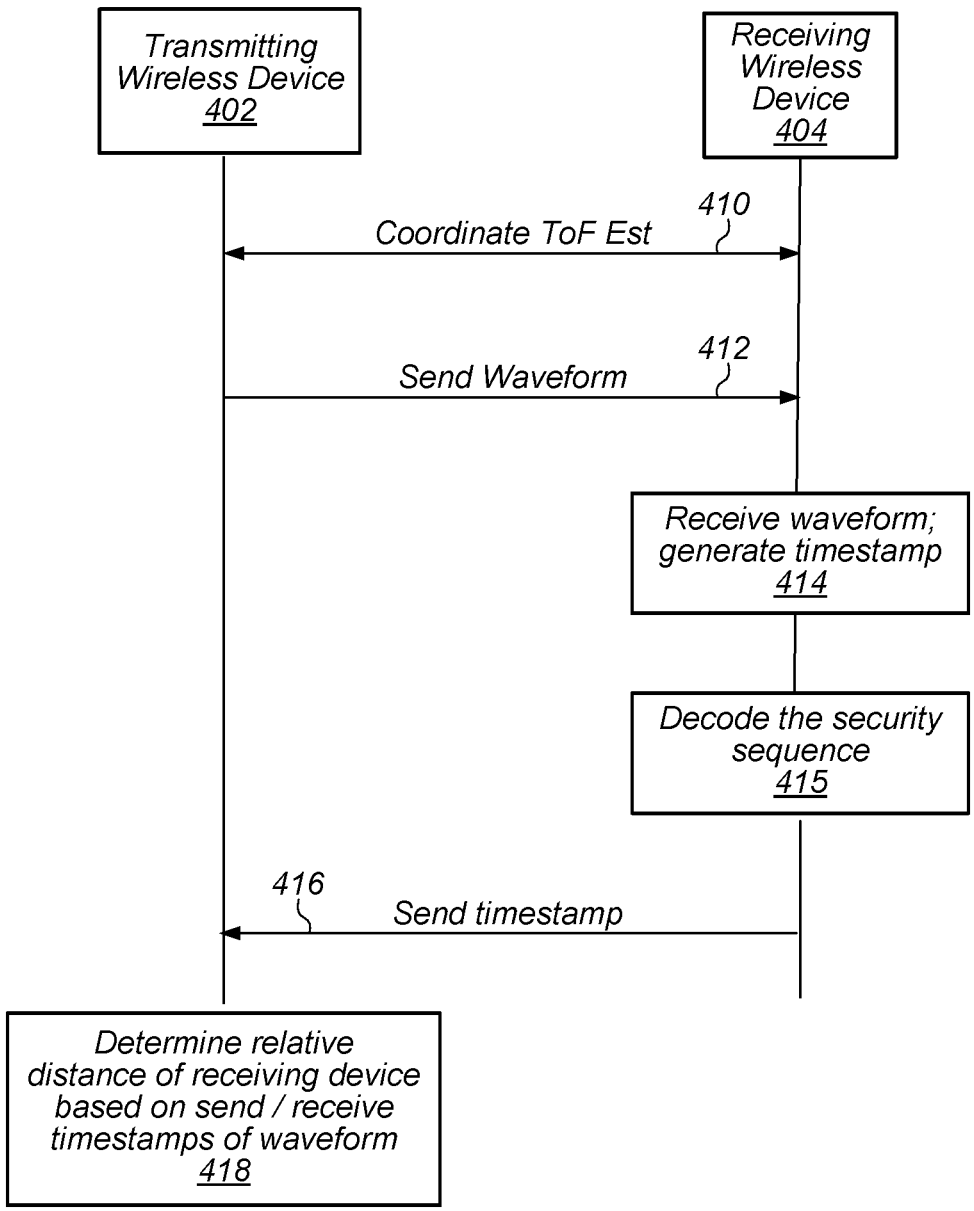
FIG. 4 is a signal flow diagram illustrating aspects of an example method for performing time-of-flight estimation in wireless communication, according to some embodiments.

FIG. 4—Example Signal Flow of a Time-of-Flight Estimation

FIG. 4 illustrates an example signal flow of a time-of-flight estimation according to some embodiments.

As shown, at 410 a transmitting wireless device and a receiving wireless device may coordinate to perform time-of-flight estimation. This may involve the transmission of various packets between the transmitting wireless device 402 and the receiving wireless device 404. For example, the coordination may include a handshake procedure, e.g., as defined by IEEE 802.11(v). The transmitting wireless device 402 and the receiving wireless device 404 may be any wireless devices that support the communication for time-of-flight estimation, such as any of the devices 102-108 shown in FIG. 1, among other possible devices.

At 412 the transmitting wireless device 402 sends a waveform to the receiving wireless device 404. The transmitting device 402 may also generate a first timestamp indicating the time that the waveform was transmitted. The transmitted waveform may be that shown in FIG. 5, as one example. Further, the transmitted waveform may include a security sequence.

At 414 the receiving wireless device 404 receives the waveform and generates a second timestamp to indicate the time of arrival of the waveform. The nature of the waveform and its decoding are discussed further below.

At 415 the receiving wireless device 404 may decode at least a portion of the security sequence in the received waveform and verify that the decoded portion of the security sequence has an expected value. Decoding and verifying at least a portion of the security sequence by the receiving device 404 may help confirm that the waveform is intended for the receiving device 404 and may provide security, e.g., may help prevent attacks from unauthorized devices. In some embodiments, the time of flight estimation may only be considered valid after successful decoding and verifying of at least a portion of the security sequence. For example, in a man-in-the-middle attack, a third party may attempt to spoof the waveform, such that the receiving wireless device 404 generates the second timestamp at an incorrect time. However, if the estimation is only considered valid after successful decoding of at least a portion of the security sequence, and verifying that the decoded portion has an expected value, then any such attack would require the third party to have knowledge of (or correctly guess) the security sequence. In some scenarios, a security sequence, a set of security sequences, or a means for determining a security sequence may be securely communicated or negotiated in advance between the transmitting wireless device 402 and the receiving wireless device 404, e.g., during the coordination at 410 or during initial connection establishment.

At 416 the receiving wireless device 404 may send this second timestamp generated in 414 to the transmitting wireless device 402.

At 418 the transmitting wireless device may use the first and second timestamps to estimate the distance of the receiving wireless device from the transmitting wireless device. For example, in some scenarios, the relative distance may be estimated by multiplying the time-of-flight by the speed of light. The time-of-flight may be calculated, e.g., as the time difference between the first and second timestamps, and may in some scenarios be adjusted to account for processing time at the transmitting wireless device 402 and/or the receiving wireless device 404, or to account for other delays. Alternatively, the transmitting wireless device 402 may send the first timestamp to the receiving wireless device 404, e.g., in a subsequent communication, and the receiving wireless device may use the first and second timestamps to estimate the distance of the receiving wireless device from the transmitting wireless device.

Figure 5:
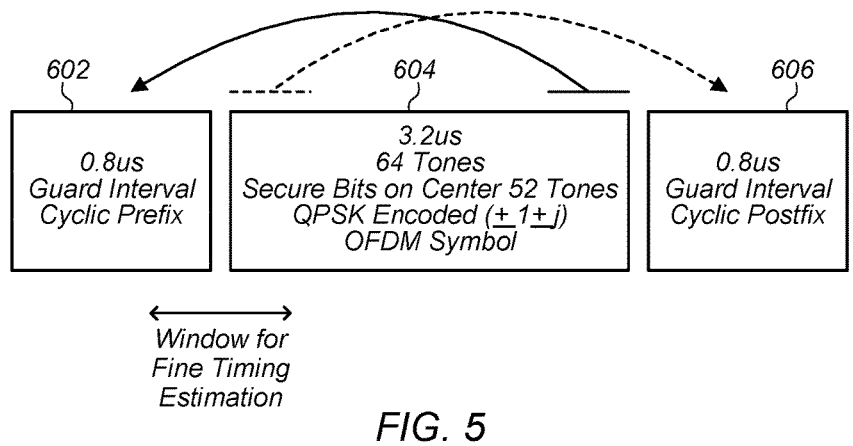
FIG. 5 illustrates an example waveform used for time-of-flight estimation in a wireless communication system according to some embodiments.

FIG. 5—Waveform for Time-of-Flight Estimation

FIG. 5 illustrates an example waveform used for time-of-flight estimation in a wireless communication system according to some embodiments described herein.

As shown, in some embodiments the waveform includes a cyclic prefix 602 that acts as a guard interval, followed by a symbol 604 that includes a plurality N of tones, followed by a cyclic postfix 606 that also operates as a guard interval. The symbol 604 may be an OFDM (Orthogonal Frequency Division Multiplexing) symbol. The timing boundary between the cyclic prefix 602 and the OFDM symbol 604 may provide the window during which the fine timing estimation is performed. More specifically, when a first node such as a base station or another station (e.g., a peer Wi-Fi device) sends this waveform to a second station, the second station receives the waveform and may create a timestamp at this boundary between the cyclic prefix 602 and the OFDM symbol 604.

The number N of tones and the size of the tones may be such that the N tones fill the entire available channel bandwidth. For example, in some embodiments that conform to the Wi-Fi standard, a channel having a bandwidth of 20 MHz may be used with N=64 tones, each tone being 0.3125 MHz in width. In other embodiments that conform to the Wi-Fi standard, a channel having a larger bandwidth (e.g., 40 MHz, 80 MHz, or 160 MHz) may be used with the same tone size, such that the number N of tones is correspondingly larger (e.g., N=128, 256, or 512, respectively). In other embodiments, a smaller tone size may be used, such that more tones would be included in channel having a given bandwidth. For example, a 20 MHz channel may be used with N=256 tones, each tone being 0.078125 MHz in width.

In at least some embodiments, the devices 102-108 shown in FIGS. 1 and 2 operate according to a design or standard where the devices are configured to decode symbols having a certain number M of tones. In at least some embodiments, N is greater than M. In other words, the waveform used in the time-of-flight estimation may include a greater number of tones than the number of tones that the receiving device is configured to decode. For example, the devices shown in FIG. 2 may be configured to perform a frequency transform on a signal having a certain number M of tones, and the transmitted waveform used for ToFE has a greater number N of tones. Compared to M tones, a greater number of N tones provide for better timing estimation.

In addition, in some embodiments, the waveform is encoded using a more robust form of encoding than that specified by the relevant standard according to which the devices operate. For example, the relevant standard (e.g., Wi-Fi) may specify PBSK (Binary Phase Shift Keying), but the waveform may be encoded using QPSK (Quaternary Phase Shift Keying). The QPSK constellation may provide better security than the PBSK constellation. This is especially so when a longer sequence of 2M (104) bits is used as the portion of the security sequence to be decoded, instead of M bit (52 bits). Further detail on the QPSK encoding that may be used herein is provided below.

The waveform may take on various different forms based on the QPSK modulation being performed. In one embodiment, the length of the waveform sequence may be increased from N to 2N, and thus the length of the portion of the sequence to be decoded by the receiving device may be increased from M (e.g., 52) to 2M (e.g., 104) bits. Because a longer sequence is more difficult (e.g., more statistically unlikely) for a third party to guess, this may serve to improve the security of the sequence, and thus the waveform described herein may provide greater security than current waveforms. In another embodiment, the QPSK signal may be sent as two BPSK signals, e.g., one on the in-phase axis: x[1:64] and one on the quadrature axis: x[64:1], i.e., a reversal of in-phase sequence. Other forms of modulation are also contemplated.

The OFDM symbol may be QPSK encoded (±1, ±j). In at least some embodiments that conform to the Wi-Fi standard, the devices are configured to decode (or perform frequency transforms on) 52 tones. In other words, Wi-Fi standard 802.11n specifies the use of 52 tones. In this embodiment, the receiving device may decode and verify the bits of the OFDM symbol positioned on the center 52 tones of the 64 tones that make up the waveform. Because bandwidth of a signal is inversely related to time resolution of the signal, the use of 64 tones in the ToFE waveform can provide for better timing estimation and/or better accuracy than the 52 tones specified by the Wi-Fi standard.

In the specific embodiment shown in FIG. 5, the waveform includes a 0.8 microsecond cyclic prefix 602, which operates as a guard interval. This prefix 602 may be followed by a 3.2 microsecond OFDM symbol 604 that includes 64 tones. To increase robustness, this OFDM symbol may be followed by another 0.8 microsecond cyclic postfix 606 that operates as a guard interval. The cyclic postfix 606 operates to absorb the delay spread in the channel, to help ensure that a clean copy of the OFDM symbol 604 is received. While the postfix 606 may provide more robustness, it may be omitted in some embodiments. The 0.8 microsecond (μs) prefix 602 and postfix 606 are sufficient to cover the delay spread in the channel. In other embodiments, a greater or lesser amount of prefix 602 and postfix 606 may be used, or no postfix 606 may be used. The cyclic property on both ends of the 3.2 us OFDM symbol minimizes non-orthogonal artifacts in the Fourier Matrix and provides good cross-correlation properties in the time domain.

In some embodiments, the receiving station may perform calibration to account for delays in transmission of the received waveform from the antenna to the digital portion of the modem that performs the timing estimation. This calibration accounts for the finite amount of time required for the received samples to propagate from the antenna to the buffer in the digital portion of the modem.

Prior to transmitting this time of flight estimation (ToFE) waveform, the transmitting and receiving devices may exchange various packets to set up the ToFE measurement. A channel estimate, e.g., an amount of desired gain, may be determined from these prior packet exchanges, and Automatic Gain Control (AGC) may be performed when transmitting the waveform, where the gain used is derived from these prior packet exchanges. The amount of AGC may be determined (locked) from previous packet exchanges. Frequency estimation and correction of the received waveform, including PLL (Phased Locked Loop) locking, may be performed based on previous packet exchanges.

As noted above, the receiving station may perform channel estimation to aid in decoding the received waveform. When the waveform is received by the receiving station, channel estimation may only be performed on the center M (e.g., 52) tones from the previous packet. Channel estimates are used to aid in decoding the portion of the security sequence in the center M (e.g., 52) tones to meet security requirements.

Figure 6:
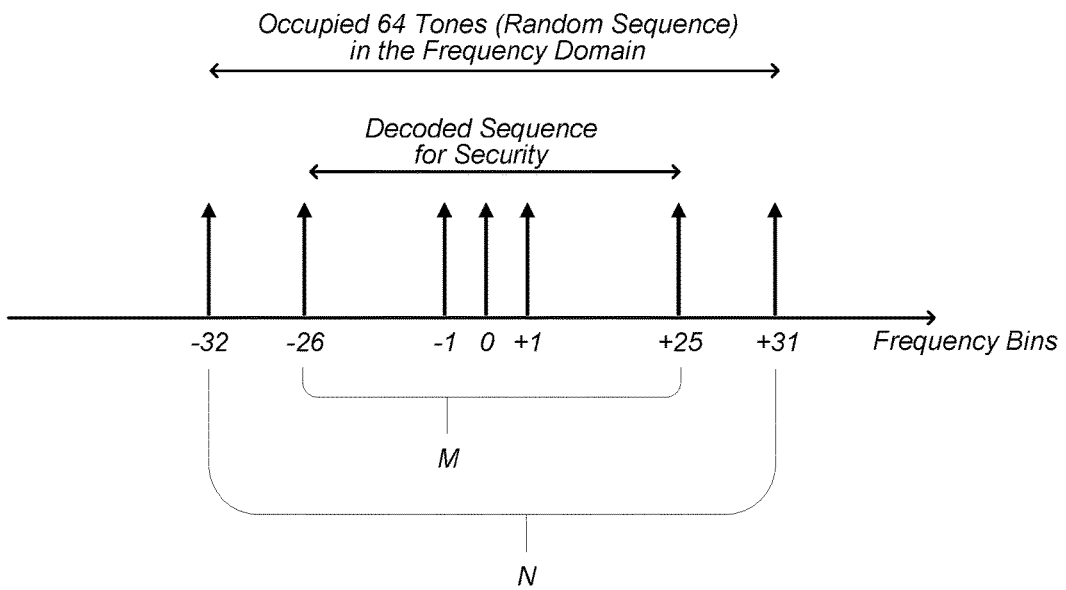
FIG. 6 illustrates a frequency domain representation of the example waveform shown in FIG. 5 according to some embodiments.

FIG. 6—Waveform Frequency Domain Representation

FIG. 6 illustrates a frequency domain representation of the example waveform shown in FIG. 5 according to some embodiments. As shown, in some embodiments the waveform may include N (e.g., 64) tones generated in N corresponding frequency bins. The N tones may correspond to a random sequence in the frequency domain. In the 802.11n embodiment described herein, the center M (e.g., 52) tones are decoded, since these may be the only tones that have a channel estimate from previous packet exchanges. For example, if the N tones fill the entire available channel bandwidth, then the edge tones may be unreliable for carrying data, e.g., because falloff exhibited by channel filters may cause the edge tones to be attenuated. However, the center M (e.g., 52) tones may reliably carry data. Thus, while a greater number N (e.g., 64) of tones may be used for timing estimation (thus providing increased bandwidth/improved time resolution), in some embodiments only the portion of the security sequence in the center M (e.g., 52) tones may be decoded by the receiving device, to verify that it has received a bona fide waveform, as discussed above. The remaining tones, e.g., the tones outside of the M tones, may not be decoded in some embodiments.

Figure 7:
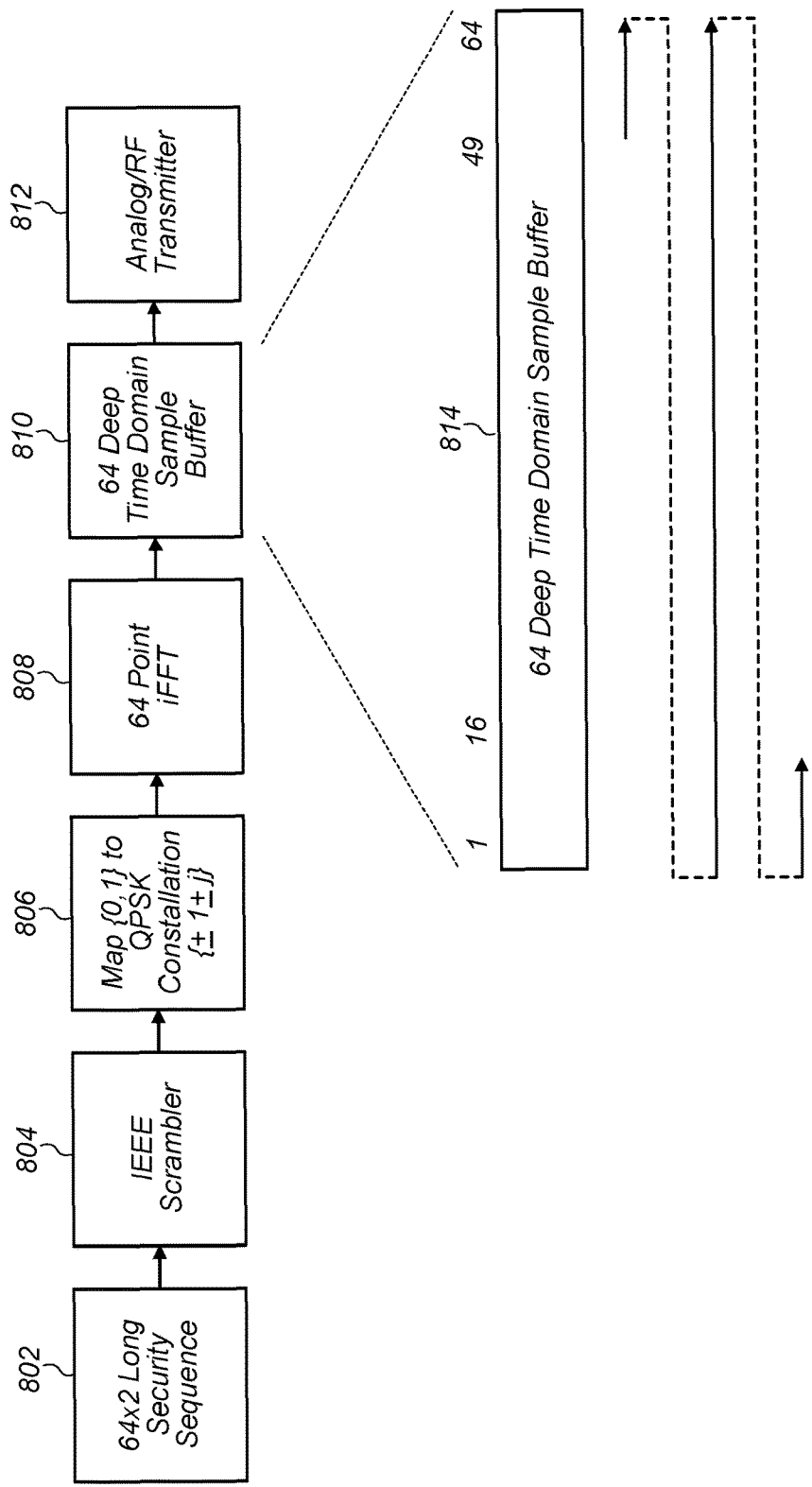
FIG. 7 illustrates an example transmit data flow for transmission of the example waveform used for time-of-flight estimation, according to some embodiments.

FIG. 7—Transmit Waveform Data Flow

FIG. 7 illustrates an example transmit data flow for transmission of the waveform used for time-of-flight estimation in a wireless communication system according to some embodiments. As shown, at 802 the transmit device may first generate a security sequence: a secure (e.g., securely negotiated with the receiving device) bit sequence that is N×2 long, e.g., a 64×2 long sequence. At 804 the security sequence may then be scrambled or randomized (e.g., using an IEEE scrambler) and then at 806 each bit may be mapped to a respective QPSK constellation point, which is ±1, ±j. Specifically, each QPSK constellation point may represent two bits of the sequence, resulting in N QPSK constellation points, representing N frequency tones. At 808 an N point (e.g., 64 point) inverse Fast Fourier Transform (iFFT) may then be performed to convert the N frequency tones of the QPSK signal into a time domain signal spanning the N frequency tones. At 810 the resultant time domain signal may then be stored in an N-deep (e.g., 64-deep) time domain sample buffer. This N-deep sample buffer may cover a time duration, such as a duration of 3.2 microseconds. The samples of the time domain signal may be transferred from the sample buffer 810 to the analog/RF transmitter 812 for transmission.

The "read" sequence from this N-deep time domain sample buffer at 810 may be as shown in FIG. 7, which begins by reading samples 49-64 of the respective sequence, followed by reading the full sequence from 1 to 64, and then finishing up with reading samples 1-16 of the respective sequence. Thus, portions of the respective sequence can be used to generate the guard interval cyclic prefix and postfix. More specifically, samples 49-64 can be used as the cyclic prefix and samples 1-16 can be used as the cyclic postfix. In the embodiment of FIG. 5, this "read" sequence from the time domain buffer generates a 4.8 microsecond long waveform. In other embodiments, different numbers of samples can be read for either/both of the prefix and postfix. Further, reads for either/both of the prefix and postfix can be omitted.

As noted above, a receiving device may decode only the center M tones of the received waveform, e.g., because the remaining tones may be attenuated. It should therefore be appreciated that in embodiments such as that shown in FIG. 7, where a scrambler is used, the receiving device verifying that the decoded portion of the security sequence has an expected value may include verifying that the decoded center 2M bits match an expected value of the center 2M bits of the output of the scrambler at 804, e.g., within a specified margin of error. Where no scrambler is used, the receiving device verifying that the decoded portion of the security sequence has an expected value may instead include verifying that the decoded center 2M bits match an expected value of the center 2M bits of the output of the security sequence generated at 802.

Figure 8:
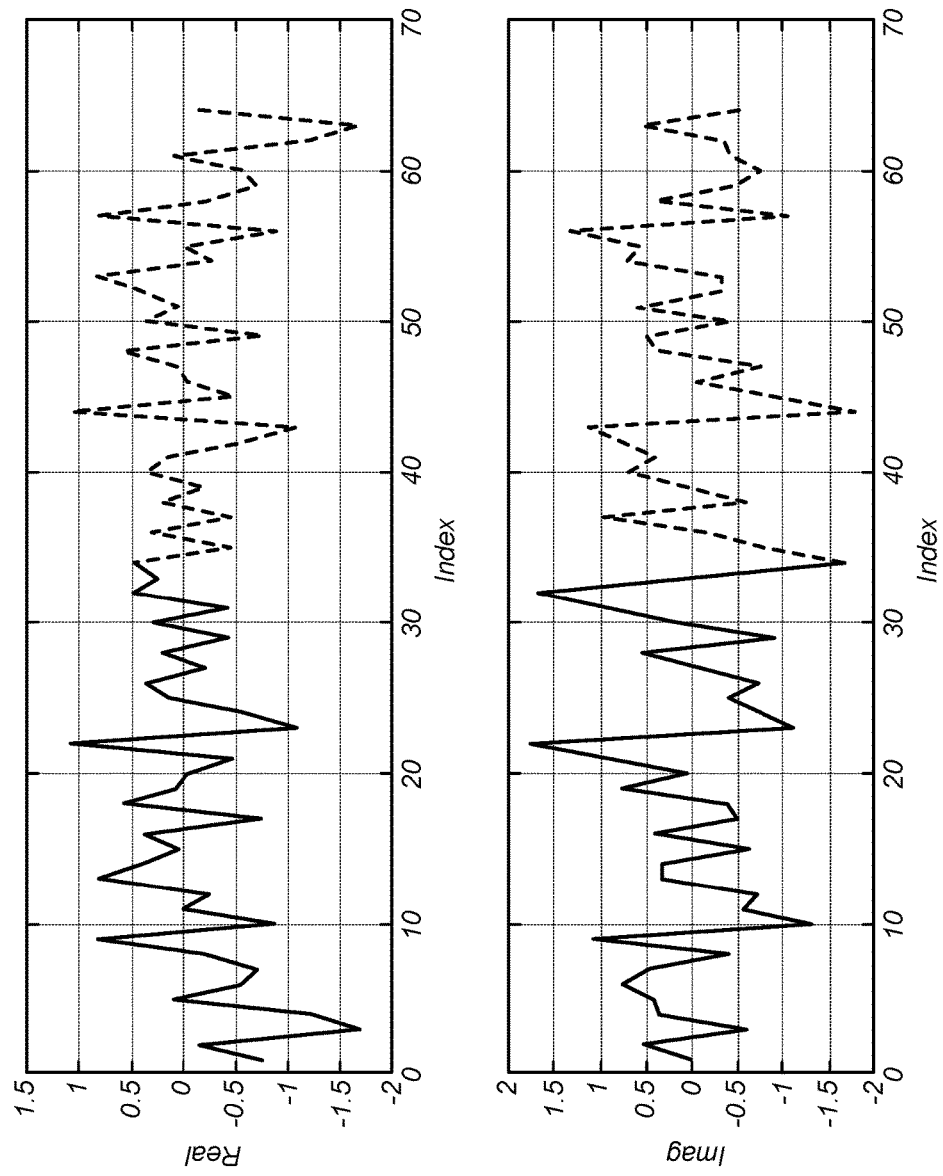
FIG. 8 shows I and Q signals in the time domain corresponding to a BPSK signal in the frequency domain.

FIG. 8—BPSK Symmetry

FIG. 8 illustrates a BPSK signal in the frequency domain that is converted to a complex (in phase and quadrate phase) signal in the time domain using an IFFT (inverse Fast Fourier Transform). Thus, FIG. 8 shows the I and Q signals in the time domain corresponding to a BPSK signal in the frequency domain. As shown, BPSK modulation produces symmetry properties in the time domain that may lead to an insecure waveform. Specifically, due to symmetry occurring in the time domain representation of a BPSK signal, the second half of the signal in time may be determined if the first half is known. By contrast, as known in the art, a QPSK signal in the frequency domain that is converted to a complex signal in the time domain does not exhibit such symmetry. Thus, a QPSK signal may provide increased security, as well as doubling the bitrate available for a given bandwidth. Hence in some embodiments, QPSK modulation is preferred over BPSK modulation.

Exemplary Embodiments

The following embodiments are envisioned.

A method may include a receiving wireless device receiving a waveform in a wireless transmission transmitted by a transmitting wireless device to perform time-of-flight estimation, wherein the waveform includes a number N of signal tones, wherein the number N of signal tones is greater than a number M of signal tones that the receiving wireless device is configured to decode. The method may further include the receiving wireless device storing a timestamp that indicates a time of receipt of the waveform; decoding M of the signal tones, wherein M is less than N; and estimating a distance between the receiving wireless device and the transmitting wireless device based at least in part on the timestamp.

In some embodiments of the preceding method, the waveform may include a cyclic prefix sent immediately prior to the N signal tones; wherein the cyclic prefix consists of a portion of the N signal tones; and wherein the timestamp is created at a time interval between the cyclic prefix and a start of the N signal tones.

In some embodiments of the preceding method, the waveform may include a cyclic prefix sent immediately prior to the N signal tones and a cyclic postfix sent immediately after the N signal tones; wherein each of the cyclic prefix and the cyclic postfix consists of a portion of the N signal tones.

In some embodiments of the preceding method, the transmitting wireless device may conform to a wireless standard that specifies a first type of encoding; wherein the waveform is encoded using a second different type of encoding.

In some embodiments of the preceding method, the waveform may be encoded using quaternary phase shift keying (QPSK) modulation.

In some embodiments of the preceding method, the waveform may include two consecutive groups of N signal tones, wherein the number N of signal tones in each group is greater than a number M of signal tones that the receiving wireless device is configured to decode; wherein said decoding may include decoding M signal tones in each of the groups of N signal tones. For example, the two consecutive groups of N signal tones may include a first group of N signal tones encoded using phase shift keying on an in-phase axis and a second group of N signal tones encoded using phase shift keying on a quadrature axis.

In some embodiments of the preceding method, the wireless transmission may be an IEEE 802.11 wireless communication.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system (e.g., a wireless device), cause the computer system to perform a method, e.g., any of a method embodiments described herein, or, any combination of the method embodiments described herein, or, any subset of any of the method embodiments described herein, or, any combination of such subsets.

In some embodiments, a wireless device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless device, comprising:
a radio; and
a processing element operably coupled to the radio;
wherein the radio and the processing element are configured to:
receive, from a transmitting wireless device, a waveform for use in performing a time-of-flight estimation, wherein the waveform comprises a number N of signal tones generated in N corresponding frequency bins, wherein the number N of signal tones is greater than a number M of signal tones that the wireless device is configured to decode;
store a timestamp which indicates a time of receipt of the waveform;
decode M of the signal tones; and
transmitting the timestamp to the transmitting wireless device for use in estimating a distance between the wireless device and the transmitting wireless device.

2. The wireless device of claim 1,
wherein the wireless device conforms to a wireless standard that specifies a first type of encoding;
wherein the waveform is encoded using a second different type of encoding.

3. The wireless device of claim 1,
wherein the waveform is encoded using quaternary phase shift keying (QPSK) modulation.

4. The wireless device of claim 1,
wherein the waveform comprises two consecutive groups of N signal tones, wherein the number N of signal tones in each group is greater than a number M of signal tones that the wireless device is configured to decode;
wherein said decoding comprises decoding M signal tones in each of the groups of N signal tones.

5. The wireless device of claim 4,
wherein the two consecutive groups of N signal tones comprise a first group of N signal tones encoded using phase shift keying on an in-phase axis and a second group of N signal tones encoded using phase shift keying on a quadrature axis.

6. The wireless device of claim 1,
wherein the waveform comprises a cyclic prefix sent immediately prior to the N signal tones;
wherein the cyclic prefix is comprised of a portion of the N signal tones;
wherein the timestamp is created at a time interval between the cyclic prefix and a start of the N signal tones.

7. The wireless device of claim 6,
wherein the waveform comprises a cyclic postfix sent immediately after the N signal tones;
wherein the cyclic postfix is comprised of a portion of the N signal tones.

8. The wireless device of claim 1,
wherein bits in the waveform are randomized.

9. A wireless device, comprising:
a radio; and
a processing element operably coupled to radio;
wherein the radio and the processing element are configured to:
transmitting, to a receiving wireless device, a waveform for use in performing a time-of-flight estimation, wherein the waveform comprises a number N of signal tones generated in N corresponding frequency bins, wherein the number N of signal tones is greater than a number M of signal tones that a receiving wireless device is configured to decode;
generating a first time stamp indicating a time at which the waveform was transmitted;
receiving, from the receiving wireless device, a second time stamp indicating a time at which the waveform was received by the receiving wireless device;
estimating, based at least partly on the first time stamp and the second time stamp, a distance between the wireless device and the receiving wireless device.

10. The wireless device of claim 9,
wherein the wireless device conforms to a wireless standard that specifies a first type of encoding;
wherein the radio and the processing element are configured to encode the waveform using a second different type of encoding.

11. The wireless device of claim 9,
wherein the radio and the processing element are configured to encode the waveform using quaternary phase shift keying (QPSK) modulation.

12. The wireless device of claim 9,
wherein the waveform comprises two consecutive groups of N signal tones, wherein the number N of signal tones in each group is greater than a number M of signal tones that the receiving wireless device is configured to decode.

13. The wireless device of claim 12,
wherein the radio and the processing element are configured to encode a first group of N signal tones using phase shift keying on an in-phase axis and to encode a second group of N signal tones using phase shift keying on a quadrature axis.

14. The wireless device of claim 9,
wherein the waveform comprises a cyclic prefix sent immediately prior to the N signal tones;
wherein the cyclic prefix is comprised of a portion of the N signal tones.

15. The wireless device of claim 9,
wherein the waveform comprises a cyclic postfix sent immediately after the N signal tones;
wherein the cyclic postfix is comprised of a portion of the N signal tones.

16. The wireless device of claim 9,
wherein bits in the waveform are randomized.

17. A non-transitory computer accessible memory medium that is comprised in a transmitting wireless device, wherein the memory medium stores:
- a waveform for use in a wireless transmission to a receiving wireless device to perform time-of-flight estimation, wherein the waveform comprises a cyclic prefix and a number N of signal tones generated in N corresponding frequency bins, wherein the number N of signal tones is greater than a number M of signal tones that a receiving wireless device is configured to decode, wherein the cyclic prefix is comprised of a portion of the N signal tones;
- wherein the waveform is useable by at least one of the transmitting wireless device or the receiving wireless device in performing time-of-flight estimation.

18. The non-transitory computer accessible memory medium of claim 17,
wherein the receiving wireless device conforms to a wireless standard that specifies a first type of encoding;
wherein the waveform is encoded using a second different type of encoding.

19. The non-transitory computer accessible memory medium of claim 17,
wherein the waveform comprises two consecutive groups of N signal tones, wherein the number N of signal tones in each group is greater than a number M of signal tones that the receiving wireless device is configured to decode.

20. The non-transitory computer accessible memory medium of claim 17,
wherein the memory medium further stores program instructions executable to perform time of flight estimation using a timestamp generated upon receipt of the waveform.

* * * * *